United States Patent
Cagenius

(10) Patent No.: US 8,094,666 B2
(45) Date of Patent: Jan. 10, 2012

(54) MAPPING AN ORIGINAL MAC ADDRESS OF A TERMINAL TO A UNIQUE LOCALLY ADMINISTRATED VIRTUAL MAC ADDRESS

(75) Inventor: Torbjörn Cagenius, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 375 days.

(21) Appl. No.: 11/993,060

(22) PCT Filed: Jun. 30, 2005

(86) PCT No.: PCT/SE2005/001048
§ 371 (c)(1),
(2), (4) Date: Jan. 25, 2010

(87) PCT Pub. No.: WO2007/004921
PCT Pub. Date: Jan. 11, 2007

(65) Prior Publication Data
US 2010/0110975 A1    May 6, 2010

(51) Int. Cl.
*H04L 12/28* (2006.01)
*H04L 12/56* (2006.01)
*H04W 4/00* (2009.01)

(52) U.S. Cl. .......... 370/401; 370/328; 370/392
(58) Field of Classification Search .......... 370/328, 370/389, 392, 401
See application file for complete search history.

(56) References Cited

U.S. PATENT DOCUMENTS

2002/0061096 A1* 5/2002 Lautenschlager et al. .......... 379/142.01
2004/0141468 A1* 7/2004 Christensen et al. .......... 370/252

* cited by examiner

*Primary Examiner* — Ronald Abelson

(57) ABSTRACT

In a network terminals communicate wirelessly through gateway devices with an access node. In the access node an original media access control (MAC) address of a terminal is mapped to a unique, locally administered virtual MAC address for the terminal. This virtual MAC address has a particular portion indicating a unit-specific use including fields that indicate a port index for the gateway device through which the respective terminal communicates with the access node, and an MAC index for the original media access control address of the terminal.

10 Claims, 2 Drawing Sheets

MAPPING AN ORIGINAL MAC ADDRESS OF A TERMINAL TO A UNIQUE LOCALLY ADMINISTRATED VIRTUAL MAC ADDRESS

FIELD OF THE INVENTION

The present invention relates to digital communication systems, in particular to systems including an Ethernet based access network and to a system, a device and a method for managing MAC addresses for use in broadband access for a wireless terminal through a wireless access node.

BACKGROUND

Ethernet is a packet-based data link layer protocol that is primarily used in LAN (Local Area Networks) but also increasingly in public broadband access networks and is specified in the standard IEEE 802.3. According to the protocol, data is transmitted in Ethernet frames. The format of a typical Ethernet frame 10 appears from FIG. 1. In each frame the first 64 bits are used only for synchronization, including a preamble 11 of 56 bits and a start of frame delimiter (SFD) field 12 of 8 bits. Fields 13, 14 and 15 for a destination address, a source address, and a length/type identifier follow the synchronization bits. In a next field 16 media access control (MAC) client data and if necessary, any extra bits (PAD) and this field may totally vary in length from 46 to 1500 octets of bits. A field 17 for a frame check sequence (FCS) adds four more octets. The frame size is generally given by the bits from and including the field 13 for the destination address up to and including the field 17 for the FCS, inclusive, and thus may vary between 64 and 1518 octets, not including an extension 18 field. For a virtual local area network (VLAN) tagged frame, four additional octets 19 of bits are inserted after the field 14 for the source address.

In conventional LANs using Ethernet each terminal connected in the LAN has a layer 2 MAC address, set by the Ethernet board itself or by the user of the terminal. This address is used for identifying the terminal in forwarding data to the terminal. In Ethernet based access networks the MAC address must be unique within the access network domain. In the address fields 13, 14 of an Ethernet frame the MAC addresses of the destination terminal or terminals and of the source terminal, respectively, are given.

In FIG. 2 the format of the six octets for an example of such an MAC address is shown. The format of the example is for the specific case of a globally administered, total MAC address as defined in the IEEE standard 802-1990, such an MAC being globally unique. The first three octets, octets Nos. 1-3, form a field 20 for an organizationally unique identifier (OUT), bit No. 8 of the first octet excepted. Each OUI is owned by and specific to a single individual organization, manufacturer or vendor that is responsible for ensuring uniqueness of the MAC addresses of units produced or provided by it, for example of network boards. Each such organization, manufacturer or vendor also assigns each such unit unique MAC address that is specific or individual to the respective unit and is located in the field 21 of the three remaining octets Nos. 4-6 of the total address field. Inside the field 20 for the OUI, in the first octet thereof, bit No. 7 is a subfield 22 in which is indicated whether the address is a globally administered or locally administered address. A zero (0) in this field indicates a globally administered address, whereas a one (1) indicates a locally administered address. Bit No. 8 of the same octet is reserved for a field 23 in which is indicated whether the address is an individual or a group address. A zero (0) in the field 23 indicates an individual address, i.e. a unicast address, whereas a one (1) indicates a group address, i.e. a multicast address. The globally administered MAC address of a unit or device intended for use in Ethernet networks is usually stored in some read-only or nonvolatile memory of the unit or device where it can be accessed by e.g. some device driver.

Generally, subscribers, i.e. the users of the terminals, can themselves easily change the MAC addresses of their terminals used when connecting to an Ethernet network. The MAC addresses that are actually used can thus be different from the globally administered MAC addresses of the terminals discussed above. A consequence of this fact is that in a network multiple devices may appear having identical MAC addresses, either intentionally, called "MAC spoofing", or by accident. Hence, the MAC address of a terminal as actually used is in the general case not usable for identification of the subscriber to which the terminal belongs.

To counter this problem, a functionality called virtual MAC (VMAC) addresses can be used, in which the MAC address of each terminal is in an access node mapped to a unique, locally generated MAC address, called the VMAC address of the terminal, such a VMAC address identifying both the terminal and the access node to which the terminal is currently directly connected.

The use of virtual MAC addresses, which are a form of locally administered MAC addresses, in Ethernet access networks is described in e.g. the published U.S. patent application No. 2004/0141468, corresponding to the published International patent application No. WO 2004/066589, these patent applications being incorporated by reference herein. In those patent applications a general method is disclosed using an address format outlined in FIG. 3, which provides 16 bits for uniquely identifying an end-user and associated MAC addresses, in octets Nos. 2 and 3, of an address field 13, 14. In the cited patent applications it is further exemplified how the 16 bits of these bytes are used for DSL (Digital Subscriber Line) access and for fiber or CAT5 access technologies. For traceability, it is suggested to include an identification of the physical port of the access node to which the end user is connected as part of these bits (line field). Furthermore, the first six bits of the first octet form a field in which a domain for locally administered, virtual MAC addresses is defined. The organizationally assigned unit unique MAC address specific to the access node is located in the field formed by octets Nos. 4-6.

Another reason to use VMAC addresses is that for increased security the MAC address of a terminal should not be used in the Ethernet access network, i.e. the original MAC address should not be revealed. This further limits the possibility to do MAC spoofing. Furthermore, there today exists a large interest from operators, standardization bodies and equipment manufacturers to use wireless access technologies in broadband access applications. Such wireless technologies can be integrated with the fixed broadband access networks. One example is IEEE 802.16 base stations used for fixed wireless access as a complement to DSL access and integrated in such access networks.

SUMMARY

It is an object of the invention to provide efficient use of VMAC addresses in a wireless access node, in particular in wireless access nodes in an Ethernet based access network.

It is another object of the invention to provide a method and an access node for applying the virtual MAC concept within a public Ethernet access network architecture.

In the prior art described above, no method is provided for how to uniquely identify an end user in a wireless access node, in which no physical port exists that attaches the end user to the access node. In the node and method as described herein a wireless end user equipment is associated with a wireless access node, maintaining traceability and MAC spoofing protection equal to that provided by the VMAC functionality in a fixed Ethernet based access network.

Thus generally, the concept of logical ports is used to uniquely identify the end user interface that should be related to the VMAC address. A logical port is a secure identifier of an end-user device connected to a wireless access node. The identifier must be protected by cryptographic means and it should preferably be possible to verify it against a certificate revocation server. An example would be the MAC address of a SS in the 802.16-2004 standard, which is embedded and thereby protected and possible to verify, in the X.509 certificate.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 4:
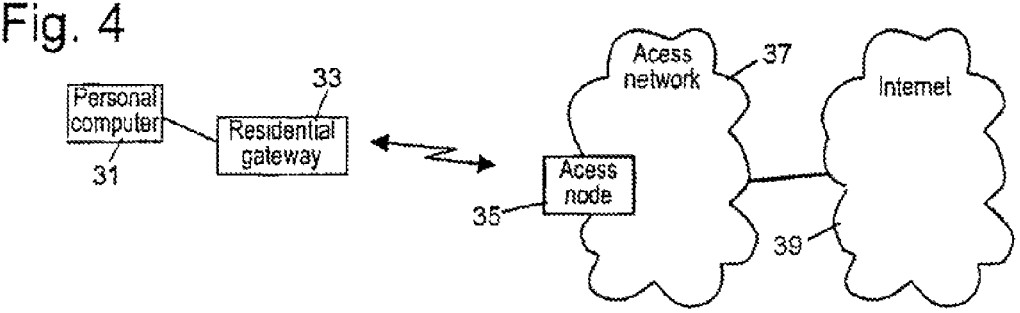
FIG. 4 is a schematic block diagram of a network illustrating an original MAC address domain and a virtual MAC address domain.

In FIG. 4 a network is illustrated that includes terminals such as personal computers (PCs) 31 or similar devices belonging to end users. The personal computers communicate wirelessly, through residential gateways (RGWs) 33, with an access node (AN) 35. Alternatively the terminals can themselves include the circuits necessary for wireless communication. The access node 35 is in turn part of an access network 37 that serves for allowing the terminals access to a general purpose network, preferably an IP-network such as the Internet 39. In a particular embodiment the residential gateway 33 is a subscriber station (SS) and the access node 35 is a base station (BS) as specified in the standard IEEE 802.16-2004. The term "subscriber station" is used in the 802.16 standard to designate the end-user equipment. The term "end user" corresponds to an owner of an SS. In the case illustrated in the figurer, one end user can have multiple terminals connected to one SS. In another case, not shown, the SS and a terminal are integrated in one unit, this allowing basically only a single terminal to use the SS. The following description is based on the mentioned standard as an example, but it is obvious to those skilled in the art that the method and node as described herein can be used also for other wireless technologies. Hence, the items 33 and 35 will hereinafter be alternatingly referred to as "residential gateway", "RGW" or "subscriber station", "SS", and "access node", "AN" or "base station", "BS", respectively.

A 802.16-2004 link is based on a secure layer 2 tunnel between the SS 35 and the 802.16 BS 37. User traffic Ethernet frames are carried as payload inside the tunnel. The tunnel provides confidentiality protection and optionally integrity protection. The establishment of the tunnel authenticates the SS towards the network. The network entry and initialization procedure for establishing the link includes the following basic steps where steps Nos. 7-9 are optional:

1. The SS scans for a downlink (DL) channel and establishes synchronization with the BS acquiring a DL channel
2. The SS obtains transmit parameters, retrieves and selects a possible uplink (UL) channel
3. A ranging process is performed by which the SS and the BS maintain the quality of RF communication between them
4. The SS and BS negotiate about basic capabilities
5. The SS is authorized and keys are exchanged
6. A registration procedure is performed in which the SS is allowed entry to the network and an optional secondary management connection is set up
7. (optional) IP connectivity for management is established in which an IP address is allocated to the SS using DHCP
8. (optional) The time of day is established
9. (optional) Operational parameters are transferred such as by downloading a configuration file using TFTP
10. Connections are set up involving that pre-provisioned service flows are set up After performing this procedure a relation between the SS 33 and the serving BS 35 has been established. End user traffic can now start to flow. During step 5. including SS authorization, the tunnel establishment is leveraged from a certificate preinstalled in the SS. Each manufacturer or provider of subscriber stations is assumed to have signed a certificate specific to each manufactured subscriber station 33. Such a certificate is tied to the SS via the unique MAC address of the SS, i.e. the globally administered MAC address of the SS, and a private key stored in the SS, and it is installed in the SS in a write-once area of the SS that is not accessible from outside the SS.

After the SS 33 has established connectivity to the BS 35 in steps 1.-4., it sends an authorization request that contains the certificate of the SS, see step 5, which includes the MAC address of the SS, i.e. the same MAC address as that used for tying the certificate to the SS.

Assuming that a link has been established between the SS 33 and BS 35 as described above, when a terminal 31 then starts to communicate with the BS 35, it transmits an Ethernet frame containing i.e. its own MAC address, this address e.g. being some address set by the user of the terminal, in the source address field 14. If this MAC address is already used by another terminal from another user, they will be separated by their SS port indices in the BS 35. Such SS port indices are set in the BS, see step 2 below, when SSs connect to the BS. Hence e.g. the first SS connected is given a port index 0, the next one 1, etc., an SS port index being the "logical port" of the BS to which the considered SS is connected. The BS 35 has a MAC handling unit, not shown, that distinguishes that this MAC address does not belong to an already connected device by comparing the received MAC address to entries in a MAC/VMAC translation table, not shown. The MAC handling unit then assigns a VMAC address to the terminal 31, the VMAC address being used in all communication associated with the terminal in the access network 37 for identifying the terminal.

Figure 1:
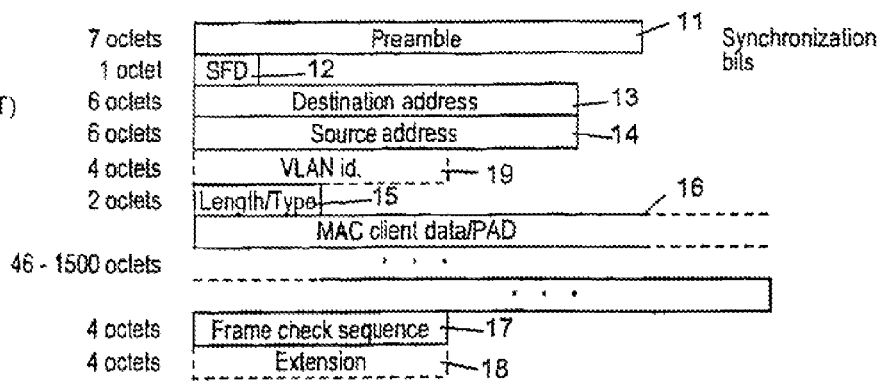
FIG. 1 is a schematic showing the use and length of different fields of a typical Ethernet frame.
Figure 2:
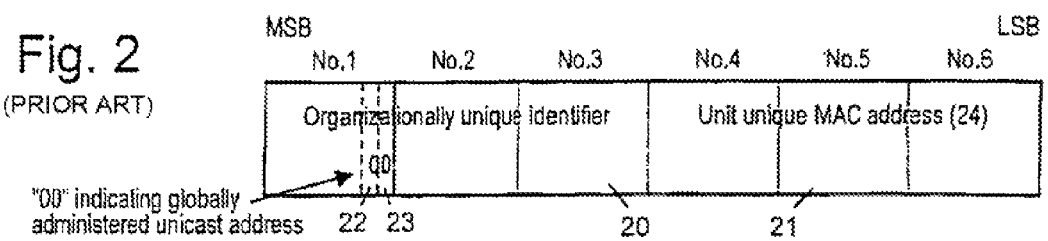
FIG. 2 is a schematic showing the format of a standard, globally administered MAC address.

If the base station 35 is configured to work according to the above cited patent applications, only bytes Nos. 2 and 3, i.e. 16 bits, of an address field of an Ethernet frame are used to define or specifically indicate the terminal 21 and the respective end user "port" or "logical port", thereby differentiating between multiple MAC addresses that each end user may have attached to that "port", since different MAC addresses of the same end user for the same SS port index will be assigned different user MAC indices, as appears from the tables below. Alternatively, the AN unique MAC address bits in the address field corresponding to field 21 of FIG. 2 can be mapped to a smaller part of the last three octets Nos. 4-6 of the MAC address, leaving more than 16 bits available for end user equipment or number of users. However, this requires a central management system to maintain this mapping table and distribute a unique index for each AN 35 to use as an identifier of the AN in the locally generated VMAC addresses.

A logical port identifier is selected to be some number or character string specific to the SS and assigned or defined in its X.509 certificate, such as the full MAC address of the subscriber station, which is part of the X.509 certificate of the SS. Alternatively, the logical port identifier can be the X.509 certificate serial number (S/N). However, since there are only 16 bits available for the identification in the address field, it is necessary to map the MAC address of the SS or the certificate serial number of the certificate of the SS to an index number that will be used in the VMAC address. A reasonable split between the number of SSs and the maximum number of MAC addresses allowed per SS or user is to reserve 12 bits (correspond to 4096 different numbers) for SS and 4 bits (=16) for MAC devices per user 33. This is valid when the SS is a layer 2 residential gateway according to FIG. 4. The end-user 33 can then have multiple layer 2 devices 31 behind the SS or residential gateway that are all visible to the access node 35. That is the reason why a VMAC unit handling multiple MAC addresses per end-user, i.e. per SS, is required. Hence, in the example a maximum of 16 terminals 31 can be connected to the same residential gateway. Alternatively a split of 11 bits (2048) for the SS 31 and 5 bits (32) for MAC devices 31 per SS can be used. The split depends on the size of the radio cell, i.e. how many users it covers, and the number of layer 2 devices that each user or each SS should be allowed to connect to the network.

Service flows (SF) are a central concept associated with the MAC layer. Such a service flow is uniquely identified, in the access node 35, by a 32-bit service flow identifier (SFID) and is used to classify user plane traffic. In the MAC layer according to IEEE 802.16-2004, a process of classification of each received packet for transmission assures that the correct SF is selected for the packet. The classification process for identifying the SF also implicitly identifies the connection to be used over the air for the transmission of the packet, since each SF is connected to a single connection. The connection itself is identified by a unique 16-bit identifier, known as a connection identifier or connection ID (CID), which is included in the 802.16 MAC header of each frame. The connection identifier identifies not only the connection, but also the SS 33 that uses it. Each SS can have multiple CIDs for e.g. different types of user traffic.

The 802.16 AN 35 must then maintain the above mentioned two tables. The tables should preferably be connected to timers to keep them up to date, see the description below. The SS port index table is kept per AN and the user MAC index table is kept per user, see Tables 1 and 2.

Tables that have to be maintained by the MAC handler of the AN to support VMAC for wireless access

TABLE 1 one per AN

| SS port index | SS MAC addresses | Connection ID |
|---|---|---|
| 0 | SS #1 MAC | CID #1, #2, ... |
| 1 | SS #2 MAC | CID #10, 11, ... |
| ... | ... | ... |
| 4095 | SS #4095 MAC | CID #n |

TABLE 2 one per SS #n MAC, i.e. one per connected user

| User MAC index | User MAC addresses |
|---|---|
| 0 | User MAC #1 |
| 1 | User MAC #2 |
| ... | ... |
| 15 | User MAC #15 |

Figure 5:
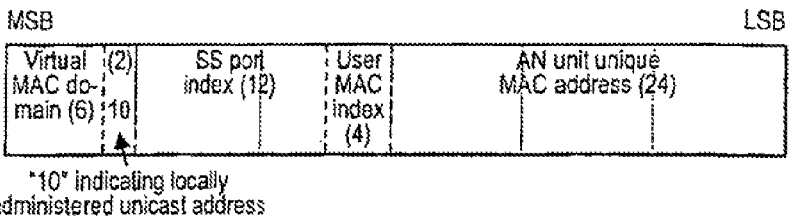
FIG. 5 is a schematic similar to FIG. 3 showing how a field for unit specific use can be used in a VMAC address suitable for access node to which terminals connect wirelessly such as for 802.16 devices.
Figure 6:
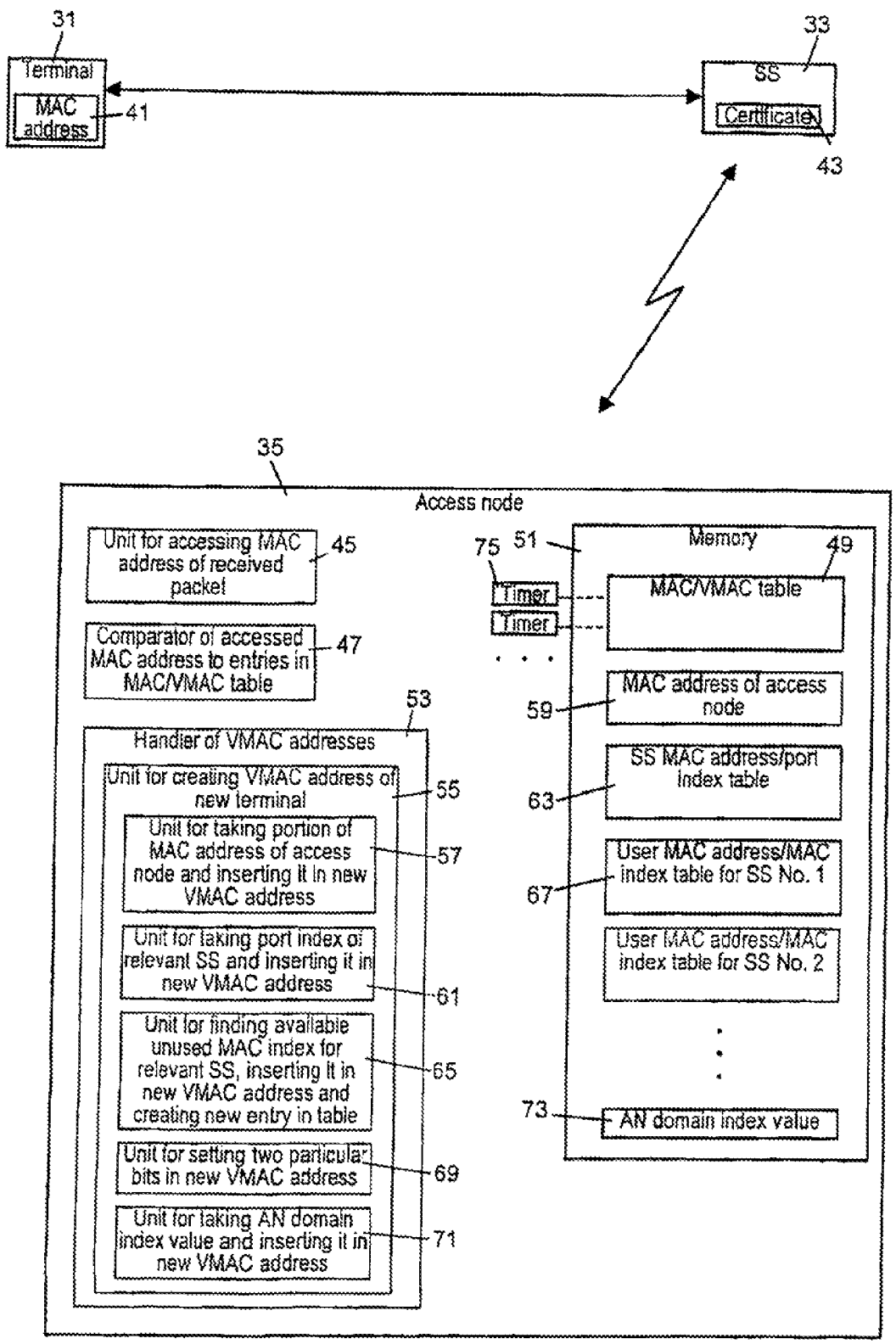
FIG. 6 is a schematic similar to FIG. 4 also showing some components of a terminal, of a residential gateway and of an access node.

In FIG. 5 the use of the 16 bits for logical port and MAC address indexes in the VMAC address is outlined. The most import components of the access node 35, the SS 31 and the terminal 31 are illustrated in FIG. 6.

When a new terminal 31, e.g. a PC, becomes connected to an SS 33, e.g. a RGW, it is identified by the 802.16 AN 35, on reception of the first upstream packet from the terminal. The 802.16 AN then creates the VMAC address of the terminal as follows, using the first example above:

1. Insert the least significant 24 bits of the own total MAC address of the 802.16 AN 35 into octets Nos. 4-6 of the VMAC address, e.g. corresponding to the organizationally defined, unit unique MAC address of the AN.
2. Insert the SS port index associated with the SS 33, from which the frame was received, into the most significant 12 bits of octets Nos. 2-3 according to FIG. 5. This is resolved from the connection ID (CID), which is associated with the SS Ethernet MAC address, passed in the upstream 802.16 frame header. The SS port index could either be preconfigured in the 802.16 AN per SS or dynamically allocated by the 802.16 AN when a new SS 33 is connected.
3. Select the next available user MAC index for the particular SS, i.e. for the particular SS port index, and insert this value, in the range of 0-15, into the least significant four bits of octet No. 3 according to FIG. 5. If all indexes are used no VMAC address will be assigned to the terminal 31. Insert the corresponding new entry in the table for the particular SS, i.e. the MAC index and the associated user MAC address.
4. The two LSBs of octet No. 1 will be set to "10" to indicate that the VMAC address is a locally administered unicast address, as described in the above cited patent applications.
5. The six MSBs of octet No. 1, i.e. the field for the virtual MAC domain) should be set to the index value of the range of 0-63 that identifies the vendor of 802.16 AN 35, as described in the above cited patent applications.

When a new VMAC address is assigned the 802.16 AN can snoop DHCP acknowledgment messages and start a timer for the VMAC address based on the IP address lease time received in the DHCP acknowledgment messages. The timer will be reset every time when upstream or downstream frames are received for an individual VMAC address. A typical maximum value for the timer would be three minutes.

If the timer for an entry in the table expires, the VMAC address will be marked as not valid or unused. If the mapping table for a specific SS is full and a new user terminal is attached to the SS, the 802.16 AN 35 will overwrite the first unused entry in the mapping table for the particular SS 33.

In order to perform the procedure described above, the access node 35 has to be configured accordingly, such as to at least include the units or functional blocks illustrated in FIG. 6. First, it is assumed that the terminal 31 has a unit 41 for creating or providing, such as a memory cell, an MAC address. In the same way the SS 33 is assumed to include a unit 43 for holding a certificate, such as a suitable memory area.

The access node 35 has, as conventional, a unit 45 for accessing the MAC address of each packet received from the SS 33. Another unit, a comparator 47 is arranged to compare the MAC address of each packet received from the SS to the entries in a MAC/VMAC table stored in a memory area 49 of a memory of the access node. In the case where the MAC address is not found in the table, this fact is signaled to a handler 53 of VMAC addresses, also called VMAC handling unit, that in turn activates a unit 55 for creating a VMAC address for this MAC address, i.e. for the terminal from which the received packet was originally sent. Said creating unit 57 starts a unit 57 that is arranged to take a predetermined portion of the MAC address of the access node, this address stored in a memory cell 59, and then to insert this portion in a predetermined location in the new VMAC address. Another unit 59 is arranged to take the port index of the SS 33, from which the packet was wirelessly transferred, by a look-up operation in the table 1 stored in a memory area 63 of the access node and to insert this port index in another predetermined location in the new VMAC address. A unit 65 is arranged to search the table 2 associated with said SS, the tables 2 stored in memory areas 67 of the memory 51, for finding an available, unused MAC index value that can be used for the terminal from which the packet was issued. If such an index value can be found, the unit 65 then enters it in a predetermined location in the new VMAC address. Also, there is a unit 69 for introducing in the new VMAC address the two bits defining that the VMAC address is a locally administered, unicast address. Finally, a unit 71 is arranged to take the AN domain index value, as stored in a memory cell 73, and to insert in its predetermined position in the new VMAC address.

Timers 75 can be associated with the entries in the MAC/VMAC table stored in the area 49. Such timers can include e.g. a unit, not shown, to update a time value, a time stamp, for each entry when a packet is received having an address corresponding to the entry. Another unit, not shown, e.g. incorporated in the finding unit 65, can in the case where there is no available MAC index value, search the MAC/VMAC table for each entry in the table 1 in the memory area 63 and remove this entry and the corresponding record in the MAC/VMAC table, in the case where the time stamp indicates that this MAC address has not been used during a predetermined time, i.e. where MAC/VMAC record is too old or has timed-out.

The proposed VMAC address allocation for 802.16 devices makes it possible to use access nodes built according to the standard 802.16 using VMAC addresses in access domains also including DSLs (Digital Subscriber Lines) and fiber access nodes. The 802.16 ANs can use a separate virtual MAC domain number, separating it from other access node types, as described in the above cited patent applications. It is not necessary for the 802.16 AN 35 to have a separate VMAC domain. If it is the same manufacturer using the same OUI for Ethernet interfaces both on his DSL nodes and his 802.16 nodes, they will be part of the same VMAC domain.

If VMAC is not used in an 802.16 AN, the default should be to use the existing MAC addresses of the user devices. They will then be differentiated from possible VMAC addresses used by other access nodes, e.g. DSL access nodes, within the access network by the 7th bit of the first byte being set to 0 in the globally unique addresses. It is also allowed to have locally administrated MAC addresses by setting the virtual MAC domain bits to zero. This means that the VMAC domain number 0 is not used. Hence, any other type of locally managed MAC address scheme is allowed, as long as the first byte of the MAC address is binary 00000010.

Figure 3:
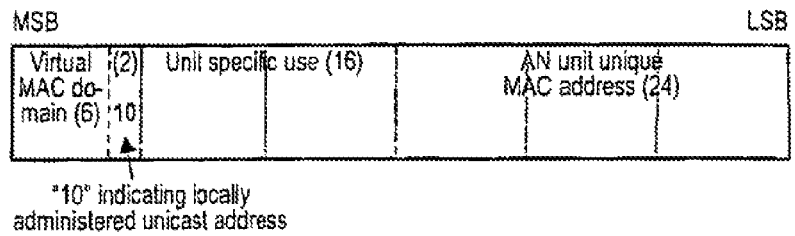
FIG. 3 is a schematic showing the general use of the six bytes in a VMAC address.

It can be observed that the SS MAC address used to generate the SS port index is the MAC address of the RF port of the 802.16 SS device as specified in the network entry and initialization procedure. This MAC address is only used in the initial ranging and SS authentication phase, as it is part of the certificate of the SS. It is not used in the end-user traffic plane, i.e. for Ethernet traffic to the end user terminal, the PC 31 in FIG. 3, which is sent as payload inside the 802.16 tunnel between the SS and BS. The SS MAC address is here only used to represent the logical port when generating the VMAC address, which represents the end-user's MAC addresses used behind the SS. A logical port is the logical relation between the SS and the BS established after the initial ranging process including the SS authentication procedure, compare the physical relation in the DSL case.

Hence, a method and an access node have been described herein that are related to the use of VMAC also for wireless access technologies and to the use of VMAC in a mixed fixed and wireless access network. They allow end user traceability and protection against MAC spoofing based on the virtual MAC concept to be maintained over wireless access nodes as well as when integrated with a fixed access network.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. An access node for wireless communication through gateway devices with terminals, the access node including a VMAC handling unit for mapping an original media access control (MAC) address of a terminal to a unique locally administered virtual MAC address for the terminal, the VMAC handling unit comprising:
   a unit for utilizing a first portion of the virtual MAC address to define a domain for the address,
   a unit for utilizing a second portion of the virtual MAC address to indicate that the address is a locally administered address, a unit for utilizing a third portion of the virtual MAC address to indicate a unit-specific use, and a unit for utilizing a fourth portion of the virtual MAC address to indicate an organizationally assigned unit-unique MAC address of or related to the access node, characterized in that the unit for utilizing a third portion of the virtual MAC address to indicate the unit-specific use is arranged to utilize fields within the third portion to indicate a port index for the gateway device through which the terminal communicates with the access node, and an MAC index for the original media access control address of the terminal.

2. The access node according to claim 1, characterized in that the unit for utilizing a third portion of the virtual MAC address includes a memory for storing a first table listing port indices for each gateway device connected to the access node and corresponding original MAC of the respective gateway device, and second tables, each second table listing user MAC indices and corresponding to original media access control addresses for each terminal connected to the access node through one of the gateway devices.

3. A method of mapping, for terminals wirelessly communicating through gateway devices with an access node, an original media access control (MAC) address of a terminal to a unique locally administered virtual MAC address for the terminal handled by the access node, the method comprising the steps of:

utilizing a first portion of the virtual MAC address to define a domain for the address, utilizing a second portion of the virtual MAC address to indicate that the address is a locally administered address, utilizing a third portion of the virtual MAC address to indicate a unit-specific use, and utilizing a fourth portion of the virtual MAC address to indicate an organizationally assigned unit-unique MAC address of or related to the access node, characterized in that the step of utilizing a third portion of the virtual MAC address to indicate the unit-specific use includes utilizing fields within the third portion to indicate a port index for the gateway device through which the terminal communicates with the access node, and an MAC index for the original media access control address of the terminal.

4. The method according to claim 3, characterized in that the step of utilizing a third portion of the virtual MAC address to indicate the unit-specific use includes mapping an original media access control address of the gateway device to the port index having fewer bits, and mapping the original media access control address of the terminal to the MAC index having fewer bits.

5. The method according to claim 3, wherein the unique locally administered virtual MAC address includes six octets, characterized in that the step of utilizing a first portion of the virtual MAC address to define a domain for the address utilizes the six most significant bits of the first octet of the virtual MAC address to define the domain, and that the step of utilizing a second portion of the virtual MAC address to indicate that the address is a locally administered address utilizes the second-least significant bit of the first octet of the virtual MAC address to indicate that the address is a locally administered address.

6. The method according to claim 5, characterized in that the step of utilizing a third portion of the virtual MAC address to indicate the unit-specific use includes utilizing the second and third octets of the virtual MAC address to indicate the unit-specific use.

7. The method according to claim 6, characterized in that the original MAC address is received by an address mapping function that maps original MAC addresses from Ethernet packets to one of a plurality of assigned locally administered virtual MAC addresses.

8. A network including terminals and an access node, the terminals communicating wirelessly through gateway devices with the access node, the access node including a VMAC handling unit for mapping an original media access control (MAC) address of a terminal to a unique locally administered virtual MAC address for the terminal, the VMAC handling unit comprising:

a unit for utilizing a first portion of the virtual MAC address to define a domain for the address, a unit for utilizing a second portion of the virtual MAC address to indicate that the address is a locally administered address, a unit for utilizing a third portion of the virtual MAC address to indicate a unit-specific use, and a unit for utilizing a fourth portion of the virtual MAC address to indicate an organizationally assigned unit-unique MAC address of or related to the access node, characterized in that the unit for utilizing a third portion of the virtual MAC address to indicate the unit-specific use is arranged to utilize fields within the third portion to indicate a port index for the gateway device through which the respective terminal communicates with the access node, and an MAC index for the original media access control address of the terminal.

9. The network according to claim 8, characterized in that the unit for utilizing a third portion of the virtual MAC address in the access node includes a memory for storing a first table listing port indices for each gateway device connected to the access node and corresponding original MAC of the respective gateway device, and—second tables, each second table listing user MAC indices and corresponding to original media access control addresses for each terminal connected to the access node through one of the gateway devices.

10. The network according to claim 8, characterized in that a gateway device is integrated with a terminal to form a single unit.

* * * * *

UNITED STATES PATENT AND TRADEMARK OFFICE
CERTIFICATE OF CORRECTION

| | |
|---|---|
| PATENT NO. | : 8,094,666 B2 |
| APPLICATION NO. | : 11/993060 |
| DATED | : January 10, 2012 |
| INVENTOR(S) | : Cagenius |

It is certified that error appears in the above-identified patent and that said Letters Patent is hereby corrected as shown below:

IN THE SPECIFICATIONS:

In Column 1, Line 51, delete "(OUT)," and insert -- (OUI), --, therefor.

Signed and Sealed this
Twenty-ninth Day of May, 2012

David J. Kappos
*Director of the United States Patent and Trademark Office*